Figure 1:
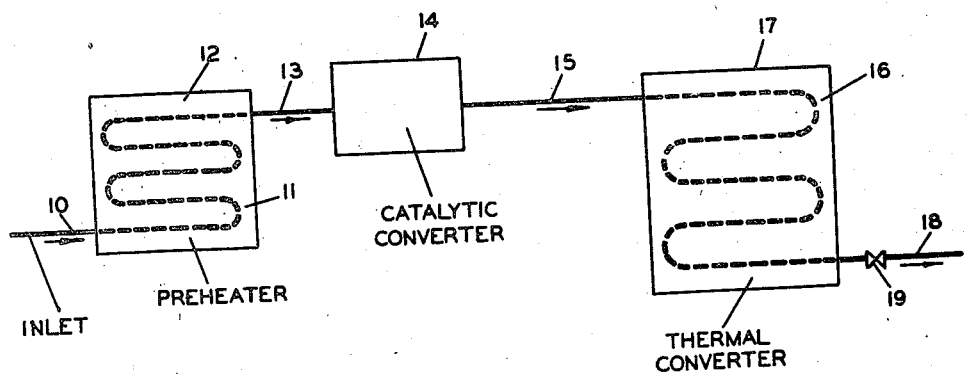

Sept. 30, 1947.   F. E. FREY   2,428,151
PROCESS FOR CONVERSION OF HYDROCARBONS
Filed April 17, 1943

INVENTOR.
FREDERICK E. FREY
BY Hudson, Young and Yinger
ATTORNEYS

Patented Sept. 30, 1947

2,428,151

UNITED STATES PATENT OFFICE 2,428,151

PROCESS FOR CONVERSION OF HYDRO-
CARBONS

Frederick E. Frey, Bartlesville, Okla., assignor to Phillips Petroleum Company, a corporation of Delaware Application April 17, 1943, Serial No. 483,435

2 Claims. (Cl. 260—683.3)

This invention relates to endothermic conversion of organic compounds, and more particularly to dehydrogenation of low-boiling hydrocarbons of two or more carbon atoms per molecule, especially those having less than six carbon atoms per molecule. This application is a continuation-in-part of my copending application Serial No. 356,080, filed September 9, 1940, which is in turn a continuation-in-part of my copending application Serial No. 305,549, filed November 21, 1939.

Dehydrogenation reactions consume appreciable heat of reaction, so that they are considered to be endothermic reactions. Such reactions generally do not approach completion at ordinary reaction temperatures, because they are in constant competition with hydrogenation reactions. That is, for any particular reactant and at any particular temperature, dehydrogenation approaches but does not exceed the maximum attained at equilibrium with the reverse reaction of hydrogenation. This maximum increases with increase in temperature, but the temperature cannot be increased indefinitely because of the occurrence of concomitant reactions, which are generally more or less undesirable. For example, in the dehydrogenation of hydrocarbons, such as the dehydrogenation of paraffins to produce olefins or diolefins, or of olefins to produce diolefins, in which the most desirable reaction is a simple elision or splitting out of hydrogen to form a less-saturated hydrocarbon having the same number of carbon atoms and the same carbon-atom structure as that of the original hydrocarbon, a major concomitant reaction is cracking or splitting of carbon-to-carbon bonds to form two or more lighter hydrocarbons, one of which is generally less saturated than the other. Such splitting of carbon-to-carbon bonds is generally considered to have the disadvantages of producing an unsaturated hydrocarbon different from that produced by simple dehydrogenation, of producing an undesirable light paraffin, and, if permitted to continue, of producing a complete breakdown of the hydrocarbon material to carbon. Nevertheless, when the reaction periods are short, and the reaction temperatures are not excessively high, these less desirable products do not necessarily predominate, and substantial yields of products resulting from simple elision or splitting out of hydrogen can be obtained. Furthermore, the dehydrogenation can be conducted in the presence of catalysts, the most desirable of which promote selectively dehydrogenation rather than scission of carbon-to-carbon bonds, in addition to increasing the speed of reaction.

Because dehydrogenation is endothermic, considerable heat must be available during the reaction period to sustain reaction. Supplying adequate heat is difficult under the most favorable conditions, and this problem is increased when dehydrogenation catalysts are used by the fact that most dehydrogenation catalysts are poor conductors of heat. In the past, endothermic catalytic conversion processes have generally been carried out by passing the reactant material through relatively small tubular catalyst chambers or through narrow catalyst-containing annular or equivalent zones. Catalyst chambers of these types have been used primarily because they are readily heated to a temperature at which the catalyst is maintained at an appropriate reaction temperature. Many catalytic reactions in general are carried out commercially on a large scale by means of converters containing a number of such small or narrow catalyst containers arranged in heat-exchange relationship with a temperature-controlling and heat-supplying medium. Substantially equivalent systems in which temperature-controlling means are placed in contact with the catalysts, such as tubular members, positioned within a body or mass of catalyst and containing a liquid of suitable boiling or condensation point, or other temperature-controlling media, have also been proposed and used.

Such previously used catalytic conversion systems have a number of disadvantages, among which may be mentioned the high cost of manufacturing the many requisite chambers or containers; the high cost of certain widely used heat-exchange media such as mercury, diphenyl, and the like; the difficulty of making and maintaining fluid-tight connections and joints, especially in large numbers; the difficulties of charging and removing the catalyst; and the difficulty of preventing leakage of the heat-exchange medium, which, like mercury, may be somewhat toxic as well as expensive.

In contrast, noncatalytic or purely thermal reactions of an endothermic nature are comparatively readily carried out in continuous processes. An elongated tube coil with a rather restricted cross section can be placed within a suitable furnace, and heat can be readily supplied along the length of the tube coil while a stream of reactants is pumped through it and while reaction proceeds. However, when it is desired to conduct a simple dehydrogenation of a hydrocarbon such a procedure is generally not applicable, since cracking and other degradation reactions proceed to a substantial extent. An attempt to modify such simple apparatus for use with catalysts has resulted in the complex catalyst chambers hereinabove mentioned, with their attendant disadvantages.

It is an object of this invention to provide an improved process involving endothermic catalytic conversions.

Another object of this invention is to effect the catalytic dehydrogenation of hydrocarbons using simple, large masses of dehydrogenation catalyst.

A further object of my invention is to dehydrogenate hydrocarbons using a series of catalyst masses.

Another object of this invention is the production of a mixture containing two different unsaturated hydrocarbons in a desirable ratio for subsequent utilization, as, for example, in catalytic interpolymerization to form hydrocarbons boiling in the motor-fuel range.

Other objects and advantages of my invention, some of which are referred to specifically herein, will be apparent from the accompanying disclosure.

In my aforementioned copending application, Serial Number 356,080, I disclosed that by a suitable combination of heating coils for the reactants and of comparatively massive catalyst chambers I can conduct catalytic dehydrogenations in an efficient manner using comparatively large catalyst masses in relatively simple catalyst chambers. I also disclosed that I can effect a satisfactory conversion, especially of certain hydrocarbon materials, by a cooperative combination of thermal and catalytic dehydrogenations, using simple large masses of dehydrogenation catalyst in the catalytic step. The disclosure and claims of the present invention are directed specifically to such a cooperative combination. I further disclosed that such large bodies of catalyst are most preferably used under substantially adiabatic conditions, that is, they are most preferably used in well-insulated catalyst chambers, so that little or no heat gain or loss occurs through the walls thereof during the process, and the only addition or withdrawal of heat during the process occurs with the reactant and effluent streams. The advantages of the use of such substantially adiabatic catalyst chambers are most successfully realized by the use of a series of such chambers, heating the reactant material during its passage from one chamber to another, and/or adding highly heated fresh reactant material to the stream passing from one chamber to another. My invention is particularly adapted to the production of low-boiling olefins such as ethylene, propylene, butenes, and pentenes, and of diolefins such as butadiene, pentadiene, isoprene, and cyclopentadiene, from the corresponding more-saturated hydrocarbons.

In accordance with this invention, a hydrocarbon is first partly converted to one or more less-saturated hydrocarbons by a catalytic treatment with a dehydrogenation catalyst substantially free from temperature-controlling media, and it is then further converted by a noncatalytic or thermal treatment, whereby an effluent of a desired composition is obtained that can be subsequently utilized for the manufacture of motor fuels, as by catalytic polymerization and/or interpolymerization of the less-saturated hydrocarbons, followed if desired by catalytic hydrogenation, or as by catalytic alkylation of one or more isoparaffins with the less-saturated hydrocarbons.

My invention is more clearly explained and disclosed in connection with flow diagrams of processes whereby it may be applied. It will now be described in connection with the accompanying drawing, which forms a part of this specification, and in which Figures 1 and 2 are flow diagrams illustrating and exemplifying methods of practicing the invention.

In the practice of one aspect of this invention, an arrangement of apparatus illustrated in Figure 1 of the accompanying drawing may be employed. The hydrocarbon material to be converted, which in general may be an aliphatic hydrocarbon having two or more carbon atoms per molecule, enters through inlet 10 and is heated in coil 11 of preheater 12 to an elevated temperature at which catalytic conversion is practicable but at which noncatalytic conversion is practically negligible. The elevated temperature is usually in the range of 800° to 1200° F.; the exact value depends upon the particular hydrocarbon material, the activity of the catalyst, the space velocity, and the extent of catalytic conversion to be effected. The heated hydrocarbon material is passed through conduit 13 to thermally insulated catalytic converter 14, in which it is subjected to the action of a catalyst, suitably a dehydrogenation catalyst of the type of bauxite or of the type of chromium oxide, associated if desired with one or more other metal-oxide materials, as is more fully set forth hereinafter, for a time sufficient to effect a conversion generally within the range of 1 to 20 per cent of the original hydrocarbon, preferably between 5 and 15 per cent. The conversion is chiefly to lighter hydrocarbons, including one or more less-saturated hydrocarbons. The resulting mixture, which has become considerably cooled because the conversion is endothermic, is then passed through conduit 15 into coil 16 heated in superheater or thermal converter 17, wherein it is heated to an elevated temperature at which noncatalytic or thermal conversion to less-saturated hydrocarbons occurs at a practical rate, usually in the range of 1100° to 1300° F. It is kept at this temperature for a time sufficient to effect such a further degree of conversion that the resulting mixture contains less-saturated hydrocarbons in a desired or preselected proportion. The total conversion effected in the catalytic and noncatalytic steps generally is in the range of 15 to 40 per cent of the original hydrocarbon, preferably between 15 and 30 per cent. The resulting mixture passes through outlet 18, controlled by valve 19, to storage or, preferably, directly to subsequent processing steps, such as catalytic interpolymerization and/or catalytic alkylation, not shown.

Catalytic converter 14, as well as any other catalytic converters used in the process, is preferably of simple construction, adapted to hold a single relatively large mass of catalyst, comprising a shell and a perforated support upon which the catalyst mass rests, as is known to the art, and is preferably unheated and well insulated against heat loss.

Figure 2:
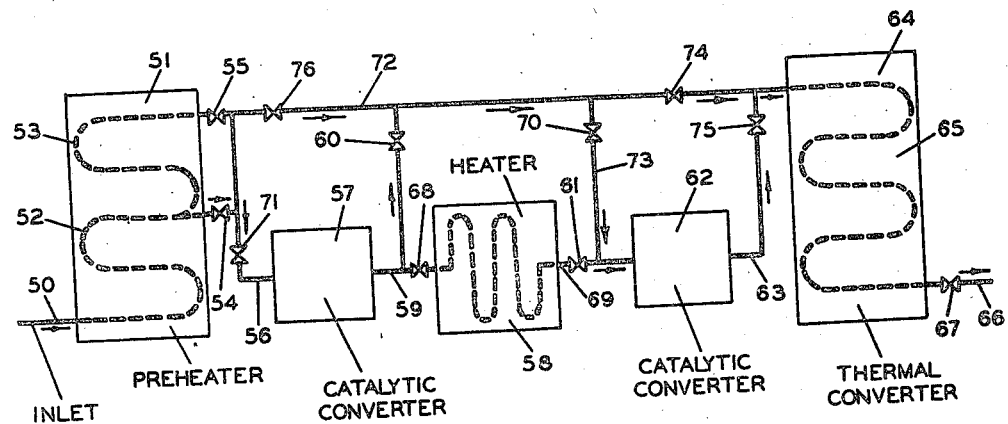

In another method of practicing the invention, which is represented by the flow diagram constituting Figure 2 of the drawing, a series of catalytic converters is used. The hydrocarbon feed is charged at inlet 50 to preheater 51 at a suitable pressure. The tubes in preheater 51 through which the hydrocarbon charge passes may be arranged so as to permit variation of the time or amount of preheating or the temperature to which the stock is heated. This may be accomplished, for example, as in Figure 2, by the arrangement of tubes 52 and 53 as shown therein, which tubes are controlled by valves 54 and 55. When valve 54 is open and valve 55 is closed, the stock will be heated only in the heated portion of tube 52 but when valve 54 is closed and valve 55 is open, the stock will be subjected to more heating by passing through the heated portions of both tubes 52 and 53.

The preheated hydrocarbon feed or charge stock then passes through conduit 56 to thermally insulated catalytic converter 57. After being subjected to treatment with the catalyst in converter 57, the stock may be passed to heater 58 by means of conduit 59; in such event, valve 60 is closed. The endothermic heat requirement of the conversion is large, and a heater to supply it is generally desirable; furthermore, the second stage of catalysis may be effected at a higher temperature than the first stage since the partially dehydrogenated mixture is generally capable of being heated higher without undergoing excessive cracking. The heated partially dehydrogenated material is then passed through conduit 69 to second catalytic converter 62, and the further dehydrogenated product is thereafter passed through conduit 63 into heated tube 64 in thermal converter 65. The conversion product is discharged through outlet 66 controlled by valve 67. When additional heating of the stock between the two catalytic converters is not desired, heater 58 may be by-passed by closing valves 68 and 61 and opening valves 60 and 70.

More than two catalytic converters may be used for the conversion. It is also desirable to have in the system at least one catalytic converter more than is to be used at any one time for the catalytic treatment, so that when the catalyst in a particular converter becomes inactive, the spare converter containing fresh or regenerated catalyst may be used, and the converter in which the catalyst has become inactive may be by-passed. For example, when in the system of Figure 2 the hydrocarbon is to be subjected to treatment in only one catalytic converter, for example, converter 62, and the other catalytic converter 57 is to be used in this manner as a spare converter, converter 57 can be by-passed by closing valves 71 and 60, so that the preheated charge stock from preheater 51, issuing from tube 52 controlled by valve 54 and/or from tube 53 controlled by valve 55, passes through conduit 72 and through conduit 73 (valves 60, 61, and 74 are closed, and valves 76 and 70 are open) into catalytic converter 62. When the catalyst in catalytic converter 62 becomes inactive, catalytic converter 57 may be placed into the train or system, and catalytic converter 62 may be by-passed by closing valves 75, 76, 70, 68 and 61 and opening valves 71, 60, and 74.

One noteworthy advantage of the sequence of a partial catalytic dehydrogenation followed by noncatalytic conversion over simple noncatalytic conversion to produce less-saturated hydrocarbons is that relatively more hydrogen is produced, so that the hydrogen requirement of the subsequent hydrogenation of polymer obtained by polymerization of the less-saturated hydrocarbons is readily met without the necessity of obtaining an extraneous supply of hydrogen; in other words, the combination of steps resulting in the over-all conversion of gaseous paraffin to hydrogenated polymer becomes fully self-contained with respect to the hydrogen requirement. This advantage is important, for example, in the manufacture of isooctane from isobutane by a combination of dehydrogenation, polymerization, and hydrogenation, especially when it is desired to effect at least a major part of the dehydrogenation in existing noncatalytic equipment and to increase the capacity of this equipment by operating at a superatmospheric pressure, such as 5 to 15 atmosphere, at which the net production of hydrogen is relatively suppressed.

Some of the aspects of the present invention are illustrated by the following examples, the specific conditions of which, however, should not be used unduly to restrict the invention.

*Example I*

Normal butane at approximately atmospheric pressure is heated to a temperature of 850° F. and is then subjected at a space velocity of approximately 2500 volumes per volume per hour to the action of a gel catalyst made by the coprecipitation of gelatinous aluminum and chromium oxides in equimolecular proportions, in an insulated catalyst chamber that is heated only by the hot butane. The resulting mixture, whose temperature has decreased to approximately 785° F. because of the endothermic conversion, has a composition approximately as follows, in per cent by volume: hydrogen, 4.4; methane, 0.3; propylene, 0.2; butylenes, 4.4; butane, 90.5; others, 0.2. The conversion is approximately 5 per cent of the normal butane. The effluent mixture is reheated and is noncatalytically converted in a gas-fired cracking coil at approximately 1100° to 1200° F. for a period of 2 to 12 seconds (depending on the temperature), so that its composition becomes approximately as follows, in per cent by volume: hydrogen, 6; methane, 8; propylene, 7; butylenes, 7; butane, 64; others, 8. The total conversion is approximately 23 per cent. The resulting mixture, after separation from light gases, is subjected to catalytic polymerization under such conditions that the propylene and the butylenes are polymerized together to form hydrocarbons boiling in the motor-fuel range. Before use in motor fuel, these polymer hydrocarbons are preferably catalytically hydrogenated to increase stability against gum formation.

*Example II*

Normal butane is treated as in Example I except that the dehydrogenation catalyst consists of cylindrical alumina pellets, one-eighth inch in length and in diameter, that support a mixture of approximately 10 per cent of green chromium oxide (known also as chromium sesquioxide) and 2 per cent of alumina, and that the temperature to which the butane is heated for the catalytic dehydrogenation is approximately 1080° F. The conversion is substantially similar to that obtained in Example I.

*Example III*

Isobutane at an average pressure of about 120 p. s. i. (9 atmospheres) is heated to about 1160° F. and is dehydrogenated to the extent of about 10 per cent by granular bauxite of the hard Arkansas type, at an average temperature of about 1100° F. and at a space velocity of about 1000 volumes (N. T. P.) per volume per hour, in a catalyst chamber that is well insulated but is not provided with any special temperature-controlling means. The composition of the resulting mixture is approximately as follows, in per cent by volume (at atmospheric pressure): hydrogen, 6.8; methane, 2.0; propylene, 1.1; isobutylene, 6.7; isobutane, 83.0; others, 0.4. This mixture is reheated and is thermally converted in a gas-fired coil at a temperature averaging about 1200° F. for a period of approximately 5.0 seconds, so that its composition becomes approximately as follows, in per cent by volume (at atmospheric pressure): hydrogen, 12; methane, 10; propylene, 5; isobutylene, 16; isobutane, 55; others, 2. The total conversion is approximately 30 per cent of the original isobutane. The effluent mixture is separated into a light-gas fraction and a heavy-gas fraction by conventional means, and the latter fraction is subjected to catalytic dimerization to form principally diisobutylene. The resulting polymer is then subjected to catalytic hydrogenation with the light-gas fraction, whereby the diisobutylene is converted to isooctane. By this operation, an excess of hydrogen is obtained, and the unneeded excess is bled off with methane and other light hydrocarbons; whereas, when the conversion of the isobutane to olefins is entirely thermal or noncatalytic, the hydrogen obtained does not meet the hydrogenation requirement, since the composition of the effluent is then approximately as follows, in per cent by volume: hydrogen, 8; methane, 13; propylene, 6; isobutylene, 14; isobutane, 55; others, 4.

Although the present invention is applicable to the treatment of any dehydrogenatable hydrocarbon having two to six or more carbon atoms per molecule, it especially can be readily and profitably applied to a charge stock comprising essentially one or more of the four lightest hydrocarbons heavier than methane, that is, ethane, propane, isobutane, and/or normal butane, and more especially when the olefins produced by the treatment of isobutane and/or normal butane are to be catalytically converted to liquid hydrocarbons in the motor-fuel boiling range and when the olefins produced from ethane and/or propane are to be subjected to thermal conversion to motor fuel. Relative to the conversion of isobutane to motor-fuel hydrocarbons, simple catalytic dehydrogenation of isobutane produces predominantly isobutylene which, when polymerized, yields isooctenes or which, when reacted with an isoparaffin such as isobutane or isopentane by alkylation, produces isooctanes or isononanes, as the case may be. Although these materials are very desirable as constituents of motor fuels, they do not by themselves constitute desirable modern gasolines because of their restricted boiling ranges. I have found that, for example, when it is desirable to produce a motor fuel from isobutane directly, a relatively more desirable charge stock can be prepared by the present process, since appreciable amounts of propylene are produced as well as isobutylene. When the resulting olefin mixture is subjected to catalytic polymerization, as disclosed in my above-mentioned copending application Serial No. 305,549, this propylene also enters into reaction, so that the polymer product approaches more closely a balanced motor fuel from the point of view of distillation range and volatility. A similar result is obtained when the olefins so produced are charged to an alkylation process and are caused to react with a material such as isobutane or isopentane in the presence of concentrated sulfuric acid, sodium chloroaluminate, concentrated hydrofluoric acid, or the like. Likewise, when olefins resulting from the dehydrogenation of ethane and/or propane are to be reacted with heavier paraffins to produce a motor fuel, as disclosed in my application Serial No. 82,954, filed June 1, 1936, now Patent No. 2,270,700, the practice of this invention results in the economical production of an olefin mixture containing appreciable amounts of both ethylene and propylene, which enter into the alkylation reaction to produce a saturated product with a well-balanced distillation range.

The lengths of the heating periods for use in the practice of the present invention are not readily defined in terms of seconds, since the specific effects of maintaining the charge at any temperature for any period of time depend on the temperature, the pressure, and the hydrocarbon material. Such effects are well known to the art, and the optimum period for each step can be readily determined by trial by one skilled in the art for any particular instance.

The use of a chromium oxide gel catalyst for the dehydrogenation of hydrocarbons has been disclosed by Huppke and Frey in U. S. Patent No. 1,905,383. Other chromium oxide containing catalysts suitable for dehydrogenation, especially of hydrocarbons, have been disclosed by Frey and Huppke in U. S. Patent No. 2,098,959, and in the following applications: Morey, Serial No. 113,091, filed November 27, 1936, now Patent No. 2,288,320; Matuszak and Morey, Serial No. 173,708, filed November 9, 1937, now Patent No. 2,294,414; Morey and Frey, Serial No. 173,709, filed November 9, 1937, now Patent No. 2,312,572; and Morey and Frey, Serial No. 359,296, filed October 1, 1940. In general, these latter catalysts comprise unglowed chromium oxide obtained by nonspontaneous thermal decomposition of chromium compounds such as chromic hydroxide or hydrated chromic oxide, ammonium-containing salts of chromic acid, and the like. These catalysts are preferred when it is not necessary to use excessively high dehydrogenation temperatures and/or when the process is operated to produce appreciable quantities of diolefins in the effluent with a minimum of secondary reactions. At other times other catalysts are cheaper and entirely suitable, such as granular synthetic alumina, bauxite, and other aluminiferous natural materials, with or without promoters such as compounds of chromium, zirconium, molybdenum, titanium, and the like.

Many modifications and variations of this invention may obviously be used, and can be adapted by one skilled in the art without departing from the spirit of the invention. The specific conditions or restrictions used in the examples, and in the drawing, need not necessarily be used as limits for all particular operations or sets of conditions, since they are presented primarily as being illustrative. It will be understood that the flow diagrams are schematic only, and that many additional conventional pieces of equipment, such as pressure gauges, valves, pumps, heat exchangers, reflux lines and accumulators, heaters and coolers, and the like, will be necessary for any particular installation, and can be supplied to meet the requirements of any particular case by anyone skilled in the art. Hence, it should be understood that the invention is limited only as defined in the appended claims.

Reference is made to my application, Serial No. 483,436, filed on even date herewith, which claims other subject matter disclosed but not claimed herein.

I claim:

1. A process for the dehydrogenation of aliphatic $C_2$ to $C_5$ paraffin hydrocarbons to less-saturated aliphatic hydrocarbons which comprises preheating said $C_2$ to $C_5$ paraffin hydrocarbon to an elevated temperature lying within the range of 800 to 1200° F. at which catalytic dehydrogenation is practicable but at which noncatalytic conversion is practically negligible, passing the so-heated paraffin hydrocarbon through a single massive stationary bed of dehydrogenation contact catalyst, said catalyst bed being well-insulated to prevent gain or loss of heat through the walls of the converter, the only addition or withdrawal of heat occurring with the incoming and effluent streams, the contact time being such as to effect a conversion of from 5 to 15 per cent of the original hydrocarbon to less-saturated aliphatic hydrocarbon, withdrawing the resulting mixture which has become considerably cooled because of the endothermic nature of the conversion, subjecting said mixture in its entirety to noncatalytic thermal dehydrogenation wherein heat is supplied thereto sufficient to maintain it at a temperature lying within the range of 1100 to 1300° F. which is higher than said first-named temperature and at which noncatalytic thermal conversion to less-saturated hydrocarbons occurs at a practical rate, holding at this temperature for a time sufficient to effect additional dehydrogenation and increase the total conversion effected in the aforementioned catalytic dehydrogenation step and in this noncatalytic dehydrogenation step to from 15 to 40 per cent of the original hydrocarbon.

2. The process which comprises heating isobutane at an average pressure of about 9 atmospheres to a temperature of about 1160° F. and passing same through a bed of granular bauxite that is well-insulated and free from temperature-controlling means at an average temperature of about 1100° F. and at a space velocity of about 1000 volumes (N. T. P.) per volume per hour and thereby effecting dehydrogenation of said isobutane to the extent of about 10 per cent with the production of an effluent containing approximately 6.8 per cent hydrogen, 2.0 per cent methane, 1.1 per cent propylene, 6.7 per cent isobutylene, 83.0 per cent isobutane, and 0.4 per cent of others, reheating the resulting effluent and thermally converting it in a noncatalytic dehydrogenation step while supplying heat thereto sufficient to maintain it at a temperature of about 1200° F. for a period of approximately 5.0 seconds and thereby effecting further conversion and increasing the conversion in both steps to approximately 30 per cent of the original isobutane, the effluent from the thermal conversion step containing approximately 12 per cent hydrogen, 10 per cent methane, 5 per cent propylene, 16 per cent isobutylene, 55 per cent isobutane, and 2 per cent of others.

FREDERICK E. FREY.

REFERENCES CITED

The following references are of record in the file of this patent:

UNITED STATES PATENTS

| Number | Name | Date |
| --- | --- | --- |
| 1,811,194 | Wagner | June 23, 1931 |
| 2,167,602 | Schulze | July 25, 1939 |
| 2,221,410 | Pier | Nov. 12, 1940 |
| 2,271,646 | Kassel | Feb. 3, 1942 |
| 2,291,581 | Schulze | July 28, 1942 |
| 2,278,223 | Sturgeon | Mar. 31, 1942 |
| 2,326,799 | Pier II | Aug. 17, 1943 |
| 2,327,099 | Eastman | Aug. 17, 1943 |
| 2,331,427 | Schulze et al. | Oct. 12, 1943 |
| 2,331,930 | Pier et al. | Oct. 19, 1943 |
| 2,337,630 | Thomas | Dec. 28, 1943 |
| 2,127,953 | Drennan | Aug. 23, 1938 |
| 2,161,247 | Dearborn | June 6, 1939 |
| 2,209,458 | Heard et al. | July 30, 1940 |
| 2,366,567 | Schultz | Jan. 2, 1945 |

FOREIGN PATENTS

| Number | Country | Date |
| --- | --- | --- |
| 844,146 | France | Apr. 11, 1939 |